United States Patent
Kim et al.

(10) Patent No.: US 6,721,660 B2
(45) Date of Patent: Apr. 13, 2004

(54) ROAD EXTRACTION FROM IMAGES USING TEMPLATE MATCHING

(75) Inventors: Taejung Kim, Daejeon (KR); Seung-Ran Park, Daejeon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 0 days.

(21) Appl. No.: 10/223,897

(22) Filed: Aug. 19, 2002

(65) Prior Publication Data

US 2004/0034473 A1 Feb. 19, 2004

(51) Int. Cl.[7] ................................................. G01V 3/38
(52) U.S. Cl. ........................................... 702/5; 340/937
(58) Field of Search ............................... 702/5; 340/937

(56) References Cited

U.S. PATENT DOCUMENTS

| | | | | |
|---|---|---|---|---|
| 5,554,983 A | * | 9/1996 | Kitamura et al. | 340/937 |
| 5,757,287 A | * | 5/1998 | Kitamura et al. | 340/937 |
| 5,913,918 A | * | 6/1999 | Nakano et al. | 701/208 |
| 6,266,442 B1 | * | 7/2001 | Laumeyer et al. | 382/190 |
| 2002/0061132 A1 | * | 5/2002 | Furukawa | 382/154 |

FOREIGN PATENT DOCUMENTS

| JP | 2002074358 A | * | 3/2002 |
|---|---|---|---|

OTHER PUBLICATIONS

Park, Seung–Ran et al., "Semi–Automatic Road Extraction Algorithm from IKONOS Images Using Template Matching," *Satellite Technology Research Center; KAIST*, vol. 1.

* cited by examiner

*Primary Examiner*—Marc S. Hoff
*Assistant Examiner*—Anthony Gutierrez
(74) *Attorney, Agent, or Firm*—Seed IP Law Group PLLC

(57) ABSTRACT

A method of extracting a road from images photographed from an artificial satellite or aircraft, which includes a first step of calculating an orientation of an initial input coordinate after selection thereof, a second step of generating a template window which is inclined by the calculated orientation with respect to the initial input coordinate, a third step of generating an initial target window moved from the generated template window in a direction of the orientation of the input coordinate, a fourth step of calculating an origin point of the optimal target window and a new orientation thereof by performing template matching for the generated initial target window, a fifth step of generating a new initial target window moved from the calculated origin point in the a direction of the calculated new orientation and repeatedly performing the fourth step until all the images have been completely processed, and a sixth step of generating the road on a map by connecting the origin points obtained from the images with one another.

8 Claims, 2 Drawing Sheets

ROAD EXTRACTION FROM IMAGES USING TEMPLATE MATCHING

BACKGROUND OF THE INVENTION

1. Field of the Invention

The present invention relates to a method of extracting a road from images, which are photographed from an artificial satellite or aircraft, in order to make a map. More particularly, the present invention relates to a method of extracting a road from photographed images by using template matching of the images.

2. Description of the Related Art

Recently, a map has been made by using images photographed from an artificial satellite or aircraft. That is, the images are first photographed from the artificial satellite or aircraft, distortion of the images is then corrected, and the corrected images are finally used for making the map. By way of such an example, there has been proposed a method of making a map by using the photographed images in Korean Laid-Open Publication No. 2001-25089. The method disclosed in the publication comprises the steps of acquiring images for map-making which are photographed at a first altitude, acquiring images for distortion correction which are photographed at a second altitude higher than the first altitude, correcting distortion of the images for map-making by using the images for distortion correction, and making the map based on corrected images for map-making.

As an example of extracting geographical objects such as roads from the photographed images so as to make the map, there has been proposed so-called a "snake" method. The snake method is performed in such a manner that a user marks dotted lines along road contours displayed in the images through his/her manual work and corrects the marked dotted lines in order to extract the road. Therefore, since the conventional methods of extracting the road depend on the manual work of the user, there are problems in that accuracy of the finally mapped road may be deteriorated and more time is required.

BRIEF SUMMARY OF THE INVENTION

The present invention is contemplated to solve the above problems. An object of the present invention is to provide a method of successively extracting a road for map-making from images by using template matching of the images.

In a method of the present invention for achieving the object, when a user selects one point on to a central line of a road as an initial input coordinate, an orientation of the coordinate is calculated. Then, a template and initial target window are generated based on the calculated orientation of the coordinate, and an adaptive least square correlation is performed with the generated template and initial target based on a similarity transformation. Once matching is finished and an optimal target window is obtained, a new initial target is generated by shifting the matched target in the direction of the orientation of the matched target and template matching repeats. As a result, the central lines of the roads corresponding to the initial input coordinates are successively extracted.

Further, there is provided a computer-readable recording medium in which a program is recorded, the program comprising instructions for causing a computer to implement a first step of calculating an orientation of an initial input coordinate after selection thereof; a second step of generating a template window which is inclined by the calculated orientation with respect to the initial input coordinate; a third step of generating an initial target window moved from the generated template window in a direction of the orientation of the input coordinate; a fourth step of calculating an origin point of the initial target window and a new orientation thereof by performing template matching for the generated initial target window; a fifth step of generating a new target window moved from the calculated origin point in a direction of the calculated new orientation and repeatedly performing the fourth step until all the images have been completely processed; and a sixth step of generating the road on a map by connecting the origin points obtained from the images with one another.

According to the present invention, since the road is extracted by user's input in a simpler manner than a conventional input method and the template matching of the image is used, there is an advantage in that the road can be extracted very accurately within a short time.

BRIEF DESCRIPTION OF THE SEVERAL VIEWS OF THE DRAWINGS

The above and other objects, advantages and features of the present invention will become apparent from the following description of a preferred embodiment given in conjunction with the accompanying drawings, in which.

DETAILED DESCRIPTION OF THE INVENTION

Hereinafter, a preferred embodiment of the present invention will be explained in detail with reference to the accompanying drawings.

Figure 1:
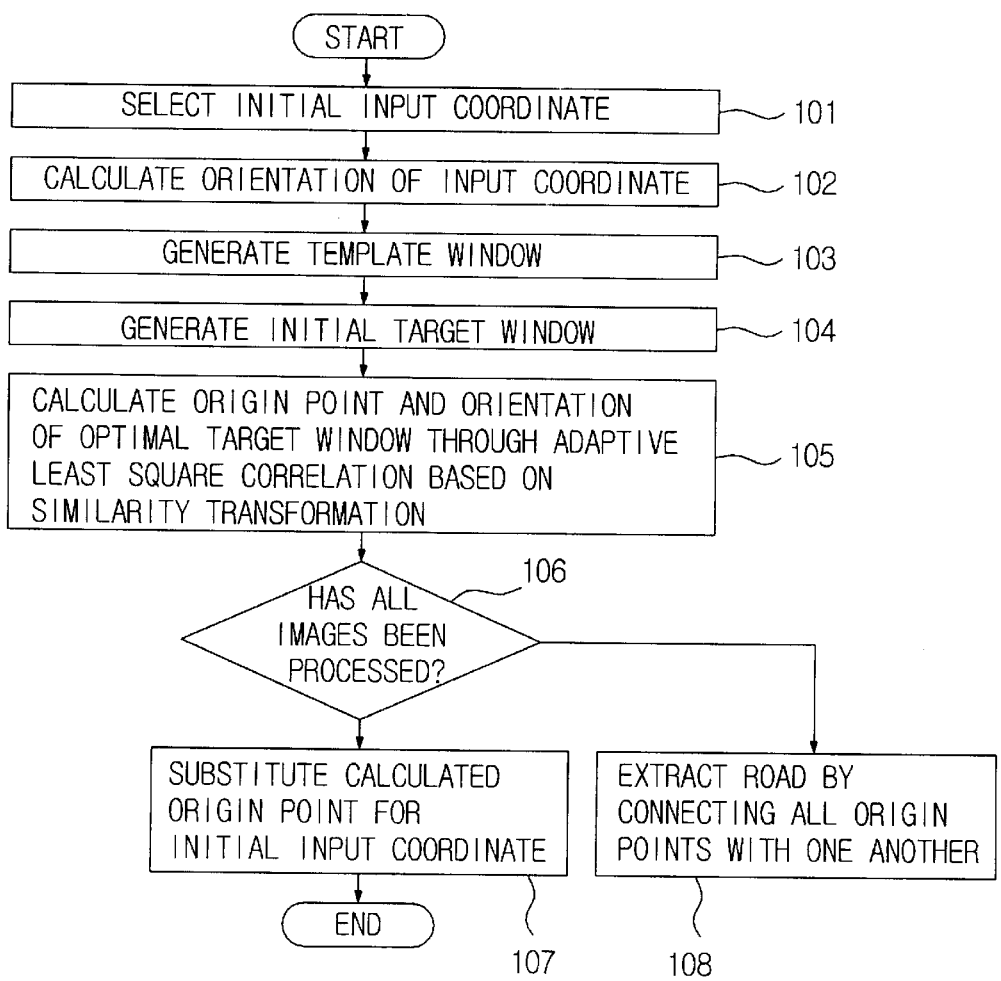
FIG. 1 is a flowchart illustrating a process of extracting a road from images according to the present invention.
Figure 2:
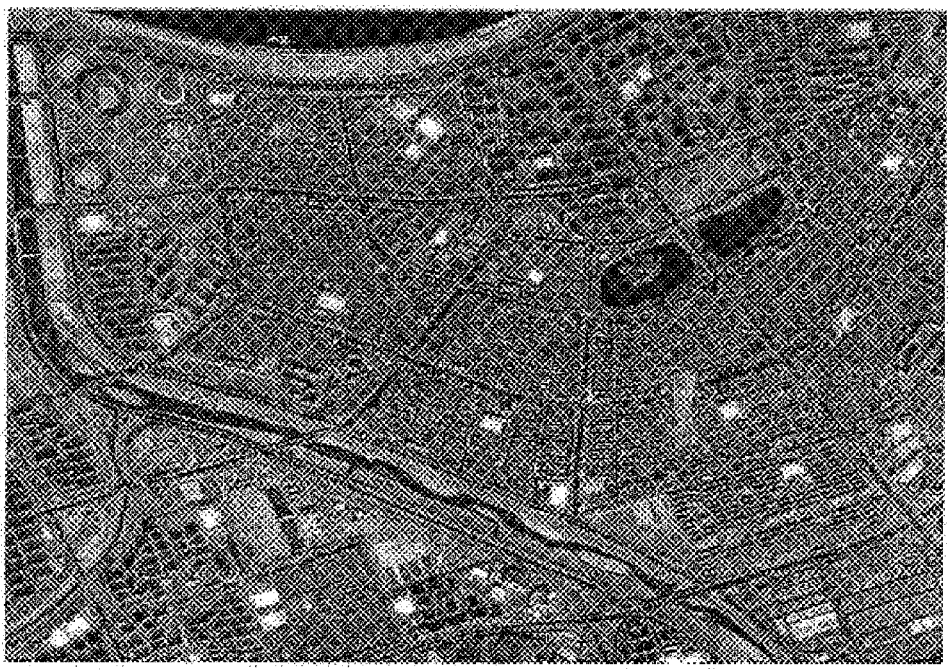
FIG. 2 is a view showing the result that roads have been extracted from the images according to the present invention.

FIG. 1 is a flowchart illustrating a process of extracting a road from images according to the present invention, and FIG. 2 is a view showing the result that roads have been extracted from the images according to the present invention.

The present invention is implemented in a conventional computer having a predetermined processing rate, and thus, a detailed description of the computer will be omitted. Further, it is preferred that images obtained by correcting photographed images be employed in the present invention. Furthermore, it is assumed that a brightness pattern of the images over a part of a road to be extracted by the present invention is similar to each other. Under such a condition, the preferred embodiment of the present invention will be explained in detail with reference to the accompanying drawings.

If a user selects as an initial input coordinate a central line of the road in the images photographed from an artificial satellite or aircraft, the initial input coordinate of the selected portion is inputted (step 101). Then, an orientation of the initial input coordinate is calculated (step 102). In order to calculate the orientation of the initial input coordinate, the following two methods may be utilized. The first method is to extract line information within a predetermined region around the initial input coordinate and to set the orientation of the initial input coordinate as the orientation of the extracted line information. Here, the extraction of the line information within the predetermined region is accomplished by extracting edges from the images based on brightness differences and linearizing the extracted edges, and it is a generally known technology. The second method is used to calculate the orientation of a region where the line information of the images is indistinct or absent. To this end, the user selects any two input coordinates. Then, a slope of a line connecting two selected input coordinates is calculated and set as the orientation of the initial input coordinate.

If the orientation of the input coordinate is calculated through the aforementioned processes, a template window inclined by the calculated orientation with respect to the initial input coordinate is generated (step 103). Here, a size of the template window is properly determined in consideration of the processing rate and the computation process of the computer. After the template window has been generated as such, an initial target window, which is moved from the generated template window in a direction of the orientation of the input coordinate, is generated (step 104). Then, an origin point of the target window and a new orientation thereof are calculated by performing the template matching for the generated target window (step 105). After a new target window moved from the calculated origin point in a direction of the calculated orientation thereof is generated, the steps following step 104 are repeatedly performed, so that the central line of the road corresponding to the initial template window is extracted (steps 106, 107 and 108).

Hereinafter, a process of performing the template matching with respect to the generated template window will be explained in detail.

First, an initial target window is generated at a location moved or shifted by a predetermined distance with respect to the generated template window (step 104). The initial target window is a provisional target window, and an actual target window is a target window having an optimal matching result which is obtained through the adaptive least square correlation based on the similarity transformation (step 105). The process of generating the actual target window through an adaptive least square matching can be explained by the following two examples.

The first example is to move the initial target window in x- and y-directions so as to generate the actual target window. This example can be formulated as the following equations (1) and (2). Equation (1) is a mathematical formula expressing the similarity transformation process between the template Window and the target window. That is, initial values of $\theta$, $s_1$, and $s_2$ in Equation (1) are determined by the step 103 and 104. Thus, a (x, y) coordinate of the initial target window, which is not optimal, is obtained by substituting the assumed initial values into Equation (1). Then, optimal values of $\theta$, $s_1$, and $s_2$ are obtained through Equation (2) by substituting the obtained coordinate into Equation (2). Finally, the optimal values of $\theta$, $s_1$, and $s_2$ obtained through Equation (2) are again substituted into Equation (1), and an origin point value of the optimal target window is consequently acquired.

$$x_{target} = x_{template} \cos\theta - y_{template} \sin\theta + s_1$$
$$y_{target} = x_{template} \sin\theta + y_{template} \cos\theta + s_2 \quad (1)$$

where $\theta$ is the orientation of the calculated target window, $(s_1, s_2)$ is a path along which the template window has been moved in the x- and y-axis directions, $(x_{template}, y_{template})$ is the origin point of the template window obtained based on the initial input coordinate, and $(x_{target}, y_{target})$ is the origin point of the target window which has been moved by a predetermined distance through the similarity transformation.

Equation (2) is a mathematical formula for finding the optimal values of $\theta$ and $(s_1, s_2)$ through the adaptive least square correlation based on the similarity transformation.

$$l = Ax \quad (2)$$
$$l = \{f(x_{template}, y_{template}) - g(xtarget, ytarget)\}$$
$$x^T = [\Delta\theta \;\; \Delta s_1 \;\; \Delta s_2 \;\; r_s]$$
$$A^T = \begin{bmatrix} -(\delta_x \sin\theta + \delta_y \cos\theta) x_{template} + (\delta_x \cos\theta - \delta_y \sin\theta) y_{template} \\ \delta_x \\ \delta_y \\ 1 \end{bmatrix},$$

where $\delta_x$ and $\delta_y$ are rates of change in the brightness value at $(x_{target}, y_{target})$ in the x- and y-axis directions, a function $f$ is a brightness function of the template window, a function $g$ is a brightness function of the target window, and $r_s$ is a difference between average brightness values of the template window and the target window.

The origin point value of the target window is calculated through Equations (1) and (2).

The second example is to generate the target window by moving only perpendicular to the orientation of the input coordinate the initial target window originally shifted from the template window in the direction of the orientation of the input coordinate. This scheme can be formulated as the following equations (3) and (4). Equation (3) is a mathematical formula expressing the similarity transformation process between the template window and the target window. That is, initial values of $\theta$, $\theta_0$ and $s_1$ in Equation (3) are determined by the step 103 and 104. Thus, a (x, y) coordinate value of the initial target window, which is not optimal, is obtained by substituting the assumed initial values into Equation (3). Then, optimal values of $\theta$ and $s_1$ are obtained through Equation (4) by substituting the obtained coordinate value into Equation (4). Thereafter, the optimal values of $\theta$ and $s_1$ obtained through Equation (4) are again substituted into Equation (3), and an origin point value of the optimal target window is consequently acquired.

$$x_{target} = x_{template} \cos\theta - y_{template} \sin\theta - \sin\theta_0 \times s_1$$
$$y_{target} = x_{template} \sin\theta + y_{template} \cos\theta + \cos\theta_0 \times s_1 \quad (3)$$

where $\theta$ is the orientation of the calculated target window, $\theta_0$ is the orientation of the initial input point and is constant, $s_1$ is a path along which the template window has been moved in perpendicular to the orientation of the input coordinate, $(x_{template}, y_{template})$ is the origin point of the template window obtained based on the initial input coordinate, and $(x_{target}, y_{target})$ is the origin point of the target window which has been moved by a predetermined distance through the similarity transformation.

In Equation (3), a mode of setting the initial values of $s_1$ and $s_2$ is modified from that used in Equation (1) under the assumption that the optimal target window is moved from the initial target window in the direction perpendicular to the orientation of the input coordinate. A (x, y) coordinate value of the initial target window, which is not optimal, is obtained through Equation (3). Then, optimal values of $\theta$ and $s_1$ are obtained through Equation (4) by substituting the coordinate value obtained as such into Equation (4). Finally, the optimal values of $\theta$ and $s_1$ obtained through Equation (4) are again substituted into Equation (3), and an origin point value of the optimal target window is consequently acquired.

Equation (4) is a mathematical formula for finding the optimal values of θ and $s_1$ through the adaptive least square correlation based on the similarity transformation.

$$I = Ax \qquad (4)$$
$$I = \{f(x_{template}, y_{template}) - g(xtarget, ytarget)\}$$
$$x^T = [\Delta\theta \quad \Delta s_1 \quad r_s]$$
$$A^T = \begin{bmatrix} -(\delta_x\sin\theta + \delta_y\cos\theta)x_{template} + (\delta_x\cos\theta - \delta_y\sin\theta)y_{template} \\ \delta_y \\ 1 \end{bmatrix},$$

The origin point value of the target window can be calculated through Equations (3) and (4).

After the processing for one target window has been completed as above, the origin point value of the calculated target window is substituted for the initial input coordinate value. Then, steps 104 to 107 are repeatedly performed until the processing for all the images has been completed (steps 106 and 107). If the origin point values are obtained through the processing for all the images, the road is extracted by connecting the origin points with one another (step 108). On the other hand, in a case where the template matching operation results in failure at least two or more times while performing the template matching, the process of the present invention is terminated.

According to the present invention, the road can be automatically extracted from the images only if the user inputs the initial coordinate value once. Therefore, there are advantages in that some problems resulting from the manual work can be solved and an accurate and clear road can be extracted.

Although only the process of extracting the road from the images has been described herein, it is possible to extract any object such as a river or building boundary from the images by using the method of the present invention. Further, it is apparent that in addition to the aforementioned template matching method, a generally known template matching method can be employed in the present invention.

Although the present invention has been described in connection with the preferred embodiment, the preferred embodiment is intended not to limit the invention but to exemplify a best mode of the present invention. It will be understood by those skilled in the art that various changes, modifications or adjustments may be made thereto without departing from the spirit and scope of the invention. Therefore, the present invention is defined only by the appended claims which should be construed as covering such changes, modifications or adjustments.

What is claimed is:

1. A method of extracting a road from an image photographed from an artificial satellite or aircraft, comprising:

a first step of calculating an orientation of an initial input coordinate after selecting a point on the road as the initial input coordinate;

a second step of generating a template window which is inclined by the calculated orientation with respect to the initial input coordinate;

a third step of generating an initial target window moved from the generated template window in a direction of the orientation of the initial input coordinate;

a fourth step of calculating an origin point of an optimal target window and a new orientation thereof by performing template matching for the generated initial target window;

a fifth step of generating a new initial target window moved from the calculated origin point in a direction of the calculated new orientation and repeatedly performing the fourth step for the generated new initial target window until the image has been completely processed; and a sixth step of generating the road on a map by connecting the origin points obtained from the optimal target windows in the image with one another.

2. The method as claimed in claim 1 wherein the orientation calculation in the first step is accomplished by extracting line information within a predetermined region around the initial input coordinate and then calculating an orientation from the extracted line information.

3. The method as claimed in claim 1 wherein the orientation calculation in the first step is accomplished by calculating a slope of a line connecting two initial input coordinates selected by a user.

4. The method as claimed in claim 1 wherein the origin point of the target window and the orientation thereof in the fourth step are calculated in accordance with the following equation (5):

$$xtarget = x_{template}\cos\theta - y_{template}\sin\theta + s_1 \qquad (5)$$
$$ytarget = x_{template}\sin\theta + y_{template}\cos\theta + s_2$$
$$I = Ax$$
$$I = \{f(x_{template}, y_{template}) - g(x_{target}, y_{target})\}$$
$$x^T = [\Delta\theta \quad \Delta s_1 \quad \Delta s_2 \quad r_s]$$
$$A^T = \begin{bmatrix} -(\delta_x\sin\theta + \delta_y\cos\theta)x_{template} + (\delta_x\cos\theta - \delta_y\sin\theta)y_{template} \\ \delta_x \\ \delta_y \\ 1 \end{bmatrix},$$

where θ is the orientation, $(s_1, s_2)$ is a path along which the template window has been moved in the x- and y-axis directions, $(x_{template}, y_{template})$ is the origin point of the template window obtained based on the initial input coordinate, $(x_{target}, y_{target})$ is the origin point of the target window which has been moved by a predetermined distance through the similarity transformation, $\delta_x$ and $\delta_y$ are rates of change in the brightness value at $(x_{target}, y_{target})$ in the x- and y-axis directions, a function $f$ is a brightness function of the template window, a function g is a brightness function of the target window, and $r_s$ is a difference between average brightness values of the template window and the target window.

5. The method as claimed in claim 1, wherein the origin point of the target window and the orientation thereof in the fourth step are calculated in accordance with the following equation (6):

$$xtarget = x_{template}\cos\theta - y_{template}\sin\theta - \sin\theta_0 \times s_1 \qquad (6)$$
$$ytarget = x_{template}\sin\theta + y_{template}\cos\theta + \cos\theta_0 \times s_1$$
$$I = Ax$$
$$I = \{f(x_{template}, y_{template}) - g(xtarget, ytarget)\}$$
$$x^T = [\Delta\theta \quad \Delta s_1 \quad r_s]$$
$$A^T = \begin{bmatrix} -(\delta_x\sin\theta + \delta_y\cos\theta)x_{template} + (\delta_x\cos\theta - \delta_y\sin\theta)y_{template} \\ \delta_y \\ 1 \end{bmatrix},$$

where θ is the orientation of the calculated initial input coordinate, $\theta_0$ is the orientation of the initial target window, $s_1$ is a path along which the template window has been moved in the y-axis direction, ($x_{template}$, $y_{template}$) is the origin point of the template window obtained based on the initial input coordinate, ($x_{target}$, $y_{target}$) is the origin point of the target window which has been moved by a predetermined distance through the similarity transformation, $\delta_y$ is a rate of change in the brightness value at ($x_{target}$, $y_{target}$) in the y-axis direction, a function $f$ is a brightness function of the template window, a function g is a brightness function of the target window, and $r_s$ is a difference between average brightness values of the template window and the target window.

6. A computer-readable recording medium in which a program is recorded, the program comprising instructions for causing a computer to implement extraction of a road from images photographed from an artificial satellite or aircraft, comprising:

a first step of calculating an orientation of an initial input coordinate after selection thereof;

a second step of generating a template window which is inclined by the calculated orientation with respect to the initial input coordinate;

a third step of generating an initial target window moved from the generated template window in a direction of the orientation of the input coordinate;

a fourth step of calculating an origin point of the optimal target window and a new orientation thereof by performing template matching for the generated initial target window;

a fifth step of generating a new initial target window moved from the calculated origin point in a direction of the calculated new orientation and repeatedly performing the fourth step until all the images have been completely processed; and a sixth step of generating the road on a map by connecting the origin points obtained from the images with one another.

7. A method of extracting a road from images photographed from an artificial satellite or aircraft, comprising:

a first step of calculating an orientation of an initial input coordinate after selection thereof;

a second step of generating a template window which is inclined by the calculated orientation with respect to the initial input coordinate;

a third step of generating an initial target window moved from the generated template window in a direction of the orientation of the input coordinate;

a fourth step of calculating an origin point of the optimal target window and a new orientation thereof by performing template matching for the generated initial target window, the origin point of the target window and the orientation thereof calculated in accordance with the following equation:

$$xtarget = x_{template}\cos\theta - y_{template}\sin\theta + s_1$$

$$ytarget = x_{template}\sin\theta + y_{template}\cos\theta + s_1$$

$$I = Ax$$

$$I = \{f(x_{template}, y_{template}) - g(xtarget, ytarget)\}$$

$$x^T = [\Delta\theta \quad \Delta s_1 \quad \Delta s_2 \quad r_s]$$

$$A^T = \begin{bmatrix} -(\delta_x\sin\theta + \delta_y\cos\theta)x_{template} + (\delta_x\cos\theta - \delta_y\sin\theta)y_{template} \\ \delta_x \\ \delta_y \\ 1 \end{bmatrix},$$

where $\theta$ is the orientation, ($s_1, s_2$) is a path along which the template window has been moved in the x- and y-axis directions, ($x_{template}$, $y_{template}$) is the origin point of the template window obtained based on the initial input coordinate, ($x_{target}$, $y_{target}$) is the origin point of the target window which has been moved by a predetermined distance through the similarity transformation, $\delta_x$ and $\delta_y$ are rates of change in the brightness value at ($x_{target}$, $y_{target}$) in the x- and y-axis directions, a function $f$ is a brightness function of the template window, a function g is a brightness function of the target window, and $r_s$ is a difference between average brightness values of the template window and the target window;

a fifth step of generating a new initial target window moved from the calculated origin point in a direction of the calculated new orientation and repeatedly performing the fourth step until all the images have been completely processed; and a sixth step of generating the road on a map by connecting the origin points obtained from the images with one another.

8. A method of extracting a road from images photographed from an artificial satellite or aircraft, comprising:

a first step of calculating an orientation of an initial input coordinate after selection thereof;

a second step of generating a template window which is inclined by the calculated orientation with respect to the initial input coordinate;

a third step of generating an initial target window moved from the generated template window in a direction of the orientation of the input coordinate;

a fourth step of calculating an origin point of the optimal target window and a new orientation thereof by performing template matching for the generated initial target window, the origin point of the target window and the orientation thereof calculated in accordance with the following equation:

$$xtarget = x_{template}\cos\theta - y_{template}\sin\theta - \sin\theta_0 \times s_1$$

$$ytarget = x_{template}\sin\theta + y_{template}\cos\theta + \cos\theta_0 \times s_1$$

$$I = Ax$$

$$I = \{f(x_{template}, y_{template}) - g(xtarget, ytarget)\}$$

$$x^T = [\Delta\theta \quad \Delta s_1 \quad r_s]$$

$$A^T = \begin{bmatrix} -(\delta_x\sin\theta + \delta_y\cos\theta)x_{template} + (\delta_x\cos\theta - \delta_y\sin\theta)y_{template} \\ \delta_y \\ 1 \end{bmatrix},$$

where $\theta$ is the orientation of the calculated initial input coordinate, $\theta_0$ is the orientation of the initial target window, $s_1$ is a path along which the template window has been moved in the y-axis direction, ($x_{template}$, $y_{template}$) is the origin point of the template window obtained based on the initial input coordinate, ($x_{target}$, $y_{target}$) is the origin point of the target window which has been moved by a predetermined distance through the similarity transformation, $\delta_y$ is a rate of change in the brightness value at ($x_{target}$, $y_{target}$) in the y-axis direction, a function f is a brightness function of the template window, a function g is a brightness function of the target window, and $r_s$ is a difference between average brightness values of the template window and the target window;

a fifth step of generating a new initial target window moved from the calculated origin point in a direction of the calculated new orientation and repeatedly performing the fourth step until all the images have been completely processed; and a sixth step of generating the road on a map by connecting the origin points obtained from the images with one another.

* * * * *